Sept. 28, 1948.  H. J. GARDENER ET AL  2,450,127
ART DEVICE
Filed May 10, 1944  2 Sheets-Sheet 1
FIG. 1
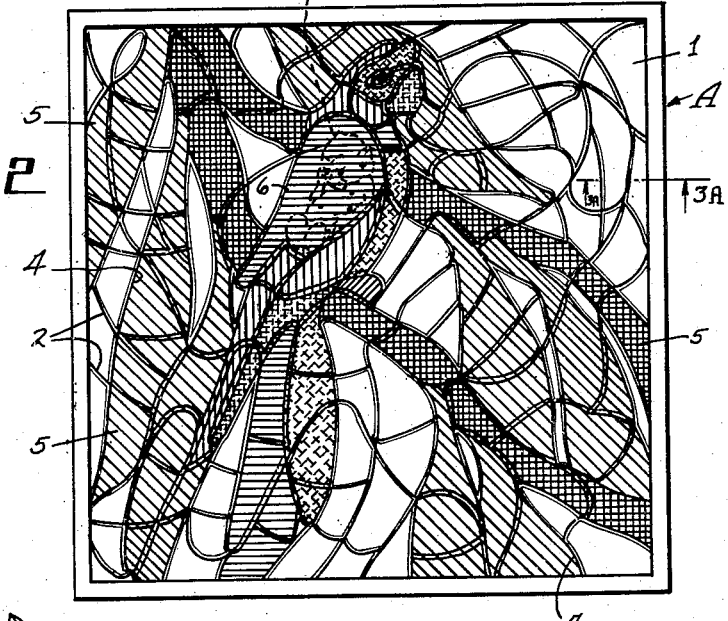
FIG. 2
FIG. 3A
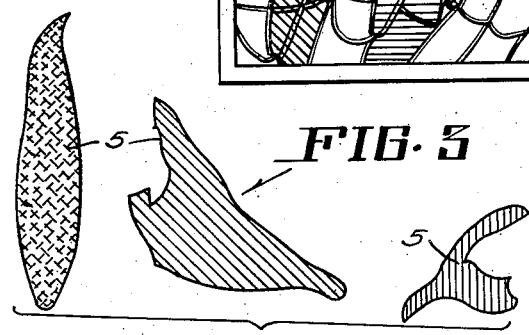
FIG. 3
INVENTORS
HARRY J. GARDENER
BY WALTER A. BLOME
ATTORNEYS Sept. 28, 1948.   H. J. GARDENER ET AL   2,450,127
ART DEVICE Filed May 10, 1944   2 Sheets-Sheet 2

INVENTORS
HARRY J. GARDENER
WALTER A. BLOME
BY
ATTORNEYS

Patented Sept. 28, 1948

2,450,127

UNITED STATES PATENT OFFICE 2,450,127

ART DEVICE

Harry J. Gardener, Los Angeles, and Walter Alford Blome, South Pasadena, Calif.

Application May 10, 1944, Serial No. 534,958

3 Claims. (Cl. 35—28)

The present invention relates to improvements in an art device, and it consists of combinations, constructions and arrangements hereinafter described and claimed.

This invention relates generally to games and toys and more particularly to those of the type involving the use of colored pieces of irregular shape and the placing of these on a support in a particular manner to cover a picture on the support and to produce a different picture. A modified form of the invention makes use of pencils, pens, crayons, brushes and other forms of marking instruments for drawing upon a surface a picture other than that originally provided on the surface and for covering the original picture.

An object of the invention is to provide an art device which is attractive to both children and adults and in which the block or prepared writing surface has prearranged demarcations thereon to form a normally visible picture or design and in addition to form a normally invisible picture, the area of which latter preferably at least partially overlaps or is otherwise related to that of the originally visible picture in a manner to render the latter sufficiently subdued as to be practically unnoticeable or obscure. When colored pieces of the proper shapes are placed in designated areas or when the marking instrument is used in accordance with certain indicia and instructions correlated with the spaces on the writing surface forming the normally invisible picture, a different picture is created and the original one is covered whereby a feature of surprise is injected into the device, all of which adds to the educational and amusement value thereof.

With this and other objects in view, the invention resides in the combinations, arrangements and functional relationships of elements as set forth in the following specification and particularly pointed out in the appended claims.

In the accompanying drawings:

Figure 1 is a plan or face view of a flat support with a picture or figure visible and with a maze of ribs forming an invisible figure;

Figure 2 is a view similar to Figure 1, with the initially invisible picture or figure made visible and the originally visible figure hidden;

Figure 3 is a view of a few of the colored pieces used;

Figure 3A is an enlarged section taken along the line 3A—3A of Figure 2;

Figure 4:
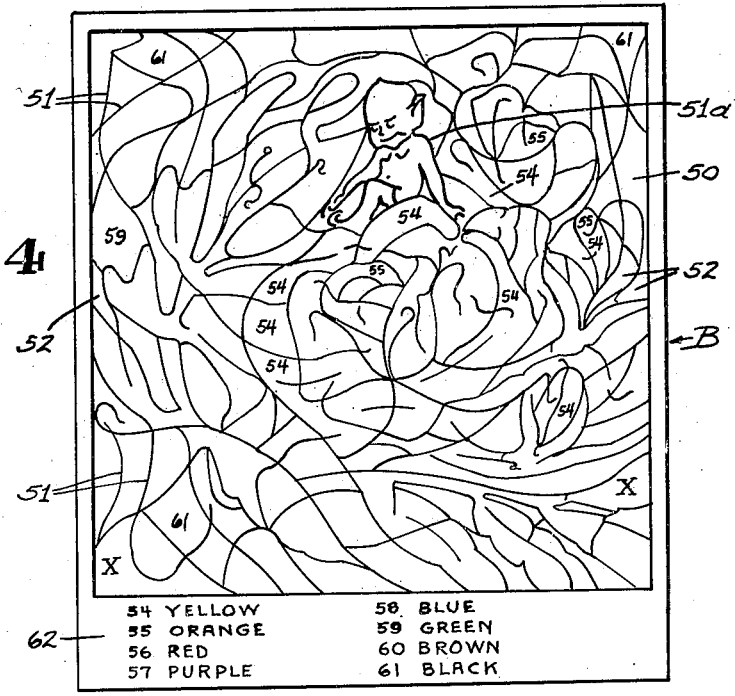
Figure 4 is a modified form of the invention showing a picture as it originally appears on the writing surface.

While we have shown only the preferred forms of our invention, it should be understood that various changes or modifications may be made within the scope of the appended claims without departing from the spirit and scope of the invention.

In carrying out our invention we show a block A or other supporting member on which an area 1 is provided with a plurality of ribs 2, these ribs being of various shapes and configurations to present a maze of demarcations that are unintelligible. The area 1 also has a picture 3 such as a gnome or other fanciful caricature thereon. The picture 3, shown in Figure 1, is delineated by heavy lines that are readily visible and will stand out from the maze of unintelligible ribs 2. It is possible to form the outline of the picture 3 with additional raised ribs 2, if desired, and then to color these ribs or make them distinctive in some way so that they will form a visible picture.

The ribs 2 define a plurality of zones 4 of irregular shapes and certain of these zones are numbered or lettered and refer to the required colored pieces 5, see Figure 3 that must be placed in the zones to form the new picture. For example the zones having the number 10 therein may have green pieces 5 placed thereon. In place of the number 10, the zone could have a g or G for designating the desired color. The shapes of the ribs 2 are designed to form another colored picture when the zones 4 are filled with the colored pieces 5. The pieces 5 are not only of different colors but are of different shapes and these shapes correspond to the shapes of the zones that are to receive the particular pieces. The player is guided as to what colored piece to place over the zone but he must pick out the piece having the same shape as the shape of the zone which is to be covered.

In Figure 2 we show the same block A with the zones 4 covered with the colored pieces 5 and it will be noted that these pieces hide the initially visible picture 3 and in turn, form another colored picture 6 which in this instance is a parrot. All of the zones 4 need not be covered with colored pieces 5 but only those that will form the picture and will hide the original picture 3. The original picture 3 is shown in dotted lines in Figure 2. Figure 3A is a section through a portion of the block A and illustrates how the ribs 2 and the margin 7 of the block form the depressions or zones 4. The pieces 5 are placed in the depressions and thus form the new picture 6.

Figure 5:
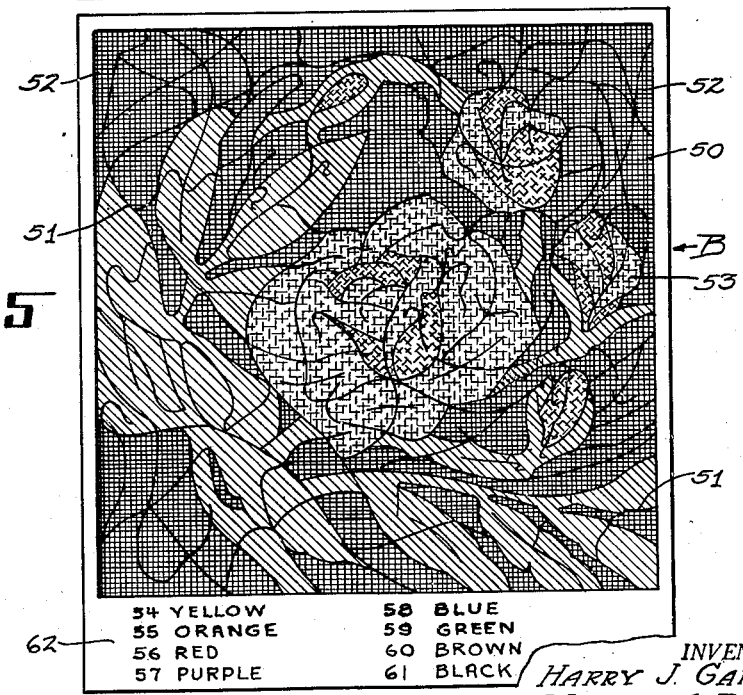
Figure 5 is a view similar to Figure 4 with the invisible picture completed and initially visible picture covered.

Reference will now be had to Figures 4 and 5 in which is illustrated a modified form of the invention composed of a support B providing a suitable writing surface 50 and having means such as demarcations or lines 51 in a predetermined arrangement for dividing the area into a multiplicity of spaces 52 in the same manner as described in connection with the forming of zones in the first form of the invention.

Certain of the lines 51a are rendered distinctive from the remainder preferably by being more pronounced as with a greater width of line or by use of a different color, so as to co-act in defining a normally visible picture or design on the writing surface 50, as clearly shown in Figure 4.

Certain of the spaces 52 which preferably include at least a portion of those making up the area of the picture 51a, co-act in defining a normally invisible picture, and can be provided with indicia for use in conjunction with a color designating chart, or can be provided with an X mark or other symbol for use in conjunction with suitable instructions preferably printed on the support B, and setting forth that the spaces marked with the symbol are to be filled in with a pencil or pen.

Upon following such instructions, the normally invisible picture will be rendered visible as shown in Figure 5 at 53, and will predominate sufficiently over the outline of the originally visible picture 51a, to render the latter practically unnoticeable by the partially superposed relationship of the two pictures and the interruption in the continuity of the outline of the original picture 51a by the colored or blacked in area forming the picture 53.

From the foregoing description of the modified form it will be manifest that the creation of a picture or design either in black and white or in colors, in accordance with this invention, provides an extremely interesting and instructive means of teaching art appreciation as well as affording amusement to those less seriously inclined. The support B can be of paper, cardboard or other sheet material which can be either a single sheet for one picture, or several sheets in book form for a number of pictures. Certain of the lines 51 co-act to define such spaces 52 as are intended to form collectively the area of the normally invisible picture 53.

If color is used to bring out the invisible picture, the spaces 52 are provided with indicia, such as numerals 54 to 61 inclusive and represent various colors which are to be applied to the respective spaces by marking instruments (not shown) such as crayons of the preselected colors which correspond to those listed in a color designating chart 62 preferably printed on the support B. By coloring each of the spaces 52 with the crayon whose color is listed in the chart in association with that number corresponding to the numeral appearing in the respective area or space, the normally invisible picture 53 will be produced in the several colors as shown in Figure 5 from the otherwise unintelligible maze of lines on the writing surface. The colors are as follows: 54 stands for yellow; 55 for orange; 56 for red; 57 for purple; 58 for blue; 59 for green; 60 for brown; and 61 for black. Letters can be used in place of numbers or different numbers can be used.

We claim:

1. An art device comprising a supporting member having a flat surface with a plurality of intersecting raised ribs defining zones of different shapes, a visible picture provided on the flat surface, and colored pieces having shapes similar to the zones and being receivable therein for covering the visible picture and for forming a new picture.

2. An art device comprising a supporting member having a flat surface with a plurality of intersecting raised ribs forming an unintelligible maze, certain of the ribs outlining a picture which is initially invisible because of the other maze of ribs, said ribs defining zones of different shapes, a visible picture provided on the flat surface and lying within the boundaries of the initially invisible picture, and colored pieces having shapes similar to and receivable by certain of the zones lying within the area bordered by the ribs outlining the initially invisible picture, whereby the initially visible picture is covered and the initially invisible picture is brought into view.

3. An art device comprising a supporting member having a flat surface with a plurality of intersecting raised ribs forming an unintelligible maze, certain of the ribs outlining a picture which is initially invisible because of the other maze of ribs, said ribs defining zones of different shapes, a visible picture provided on the flat surface and lying within the boundaries of the initially invisible picture, and colored pieces having shapes similar to and receivable by certain of the zones lying within the area bordered by the ribs outlining the initially invisible picture, whereby the initially visible picture is covered and the initially invisible picture is brought into view, the zones lying within the ribs outlining the initially invisible picture having characters therein denoting the color of the colored piece to be placed in the zone.

HARRY J. GARDENER.
WALTER ALFORD BLOME.

REFERENCES CITED

The following references are of record in the file of this patent:

UNITED STATES PATENTS

| Number | Name | Date |
| --- | --- | --- |
| 609,347 | VonHolzhausen | Aug. 16, 1898 |
| 882,463 | Griggs | Mar. 17, 1908 |
| 1,063,472 | Schultz | June 3, 1913 |